Patented June 26, 1923.

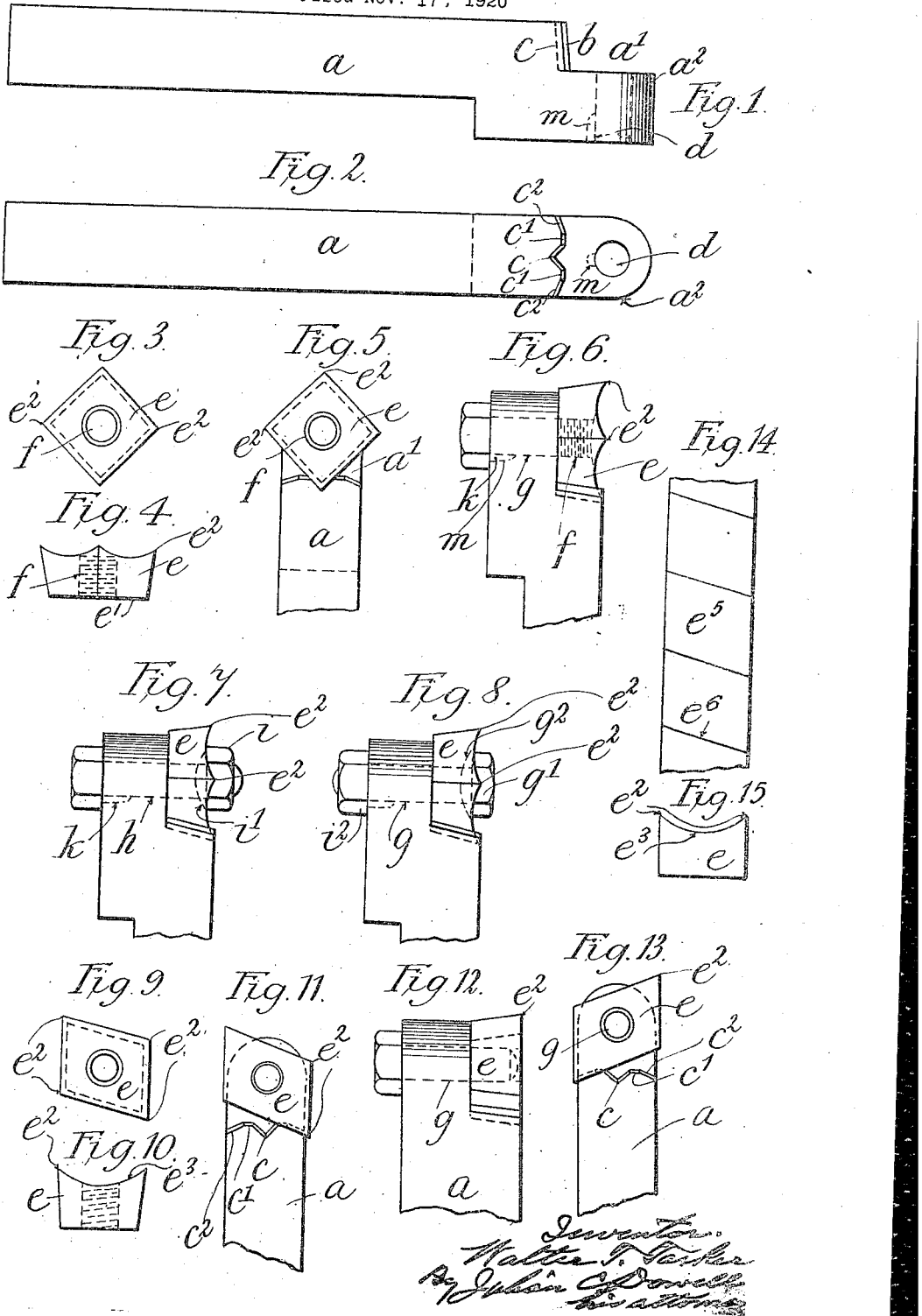

1,459,805

UNITED STATES PATENT OFFICE.

WALTER TOM TASKER, OF CLIFTONVILLE, MARGATE, ENGLAND.

TOOL AND TOOL HOLDER FOR TURNING, PLANING, AND LIKE OPERATIONS.

Application filed November 17, 1920. Serial No. 424,724.

*To all whom it may concern:*

Be it known that I, WALTER TOM TASKER, a subject of the King of Great Britain and Ireland, residing at Cliftonville, Margate, in the county of Kent, England, have invented Improvements in Tools and Tool Holders for Turning, Planing, and like Operations, of which the following is a specification.

This invention has reference to tool holders and to cutting tools for use therewith, and it has for its object to provide an improved tool holder adapted to admit of a cutting tool being easily, quickly, and firmly secured thereto in correct position for use and of such tool being quickly removed and accurately replaced in the same position, or, it may be, a different position. It also has for its object to provide an improved cutting tool that can be readily fixed to the tool holder and be made with one or more cutting points or edges which, or any one of which when several are provided, can be brought into position for use. It also has for its object to provide a cutting tool of comparatively small mass that can economically be made out of scrap tool steel, such for example as the shank portions of disused tools, and the cutting points or edges of which can be easily and accurately formed to the required shape.

To this end, a tool holder according to the invention comprises a bar of steel or like strong metal adapted to be fixed in a slide rest or equivalent support and having a recessed front end portion adapted to support vertically and to engage laterally a cutting tool so as to prevent the tool turning, after it has been fixed in place, and formed with a hole designed to receive holding down means, such as a screw or bolt, whereby the cutting tool can be rigidly fixed in position in the recessed portion of the tool holder.

A cutting tool according to the invention, designed to be used with a tool holder such as described, is made from a block of tool steel adapted to be seated in the recessed portion of the tool holder and to be engaged laterally thereby and formed with a hole for the reception of the holding down means, the block of steel being formed with one or more cutting points or edges constituted by one or more corner portions of the block. The cutting point, or each cutting point, of the tool, may be formed by cutting or grinding adjacent sides of the block to form the desired clearance and recessing the upper side of the block, adjacent to the corners, as by a rotary cutting tool, so as to form therein a concave recess of such shape and depth as to impart the required cutting angle to the tool.

A tool holder and cutting tool embodying the invention as above set forth, can be constructed in various forms.

In the accompanying illustrative drawings, Fig. 1 shows in side elevation and Fig. 2 in plan, one construction of tool holder according to the invention suitable for use with a cutting tool according to the invention. Fig. 3 is a plan and Fig. 4 an elevation, of a cutting tool suitable for use with the tool holder shown in Figs. 1 and 2. Figs. 5 and 6 are views showing in plan and side elevation, a tool holder according to Figs. 1 and 2 with a cutting tool according to Figs. 3 and 4 secured thereto. Figs. 7 and 8 are similar views to Fig. 6 showing modified methods of securing the cutting tool to the tool holder. Figs. 9 and 10 are views similar to Figs. 3 and 4 respectively, showing a modified form of cutting tool. Figs. 11 and 12 are views similar to Figs. 5 and 6 respectively showing a cutting tool of the form illustrated in Figs. 9 and 10 secured to a tool holder such as shown in Figs. 1 and 2. Fig. 13 is a similar view to Fig. 11 but with the tool in the opposite position. Figs. 14 and 15 shows in plan and end view respectively, how cutting tools according to the invention can be made from a disused steel tool shank.

According to the construction shown in Figs. 1 and 2, the tool holder $a$, formed of a bar of steel of rectangular cross section, is joggled at its front end so as to form a recess $a^1$ therein open at its front end and having at its rear end a wall or shoulder the surface of which is inclined backwardly and upwardly. This wall is formed with a central upwardly extending V-shaped recess $c$ at opposite sides of which are flat surfaces $c^1$ in a common plane and, outside of these surfaces, laterally inclined surfaces $c^2$. The projecting portion $a^2$ of the bar $a$, forming the bottom of the recess $a^1$, constitutes a seat for the cutting tool and has a hole $d$ extending vertically therethrough. The front end of the bar may, as shown in Fig. 2 be rounded but it may be of other shape, for instance square.

The cutting tool shown in Figs. 3 and 4 for use with the tool holder, is formed of a square block $e$ of tool steel having inclined sides, a central hole $f$ therethrough and a flat lower surface $e'$ and is made of such dimensions that it will fit the recessed seat $a'$ of the tool holder $a$ in such a manner that the hole $f$ in it will coincide with the hole $d$ in the holder and one of its corner portions $e^2$ will fit the V-shaped recess $c$ in the holder as shown in Figs. 5 and 6. The tool is held rigidly in place by a screw or bolt engaging both the tool and the holder. If a set screw $g$ be used, as shown in Fig. 6, its shank may be passed through the holder and engage a screw thread in the tool, its head bearing on the lower side of the holder. If a bolt $h$ be used, as shown in Fig. 7, its shank may be passed through plain holes in the tool holder and tool, its head bearing against the holder and its upper end be fitted with a nut $i$ bearing against the tool through a plano-convex washer $i^1$. To prevent the bolt turning when being fixed in place, it may be provided with a lateral lug or nib $k$ engaging a corresponding recess $m$ in the wall of the hole in the holder. The upper side of the steel block $e$ is formed with a part spherical recess so as to form with the inclined sides of the block, four cutting points $e^2$ or edges, any one of which, or each of which in turn, can, upon detaching the tool from its holder, be brought into position for use and the tool then re-fixed in the adjusted position. Instead of fixing the tool in the ways shown in Figs. 5 and 6 and Fig. 7, it may, as shown in Fig. 8, be fixed by a bolt $g$ having a thin head $g^1$ bearing upon the tool through the intervention of a washer $g^2$ having a curved surface to fit the concave recess in the tool and a flat surface for the nut, the shank of the bolt extending through plain holes in the tool and tool holder and fitted with a nut $i^2$ bearing against the underside of the holder.

In the example shown in Figs. 3 and 4 the tool is formed with a single concave recess of part spherical shape on its upper side but it may be recessed in other ways to form the required cutting points or edges. Thus it may be formed with a recess of part cylindrical shape. Also the block of steel forming the cutting tool may be of other shape than square as seen in plan, according to the shape of the cutting edge required, which may be angular or convex as seen in plan. For instance, as shown in Figs. 9 and 10, it may be of the shape, as seen in plan, of a rhomb or rhomboid having a part cylindrical recess $e^3$ on its upper side and two oppositely arranged cutting points $e^2$. In this case, the tool can be fixed in place as shown in Figs. 11 and 12, or in Fig. 13, with one of its sides bearing against one or other of the two lateral inclined surfaces $c^2$ formed on the rear wall of the recess $a'$ of the tool holder $a$ $a^2$ at opposite sides of the centre line of the tool holder. In some cases the cutting tool may bear simultaneously against the flat surfaces $c^1$ on the rear end wall or shoulder of the recessed front end of the tool holder.

Cutting tools of the kind shown in Figs. 3 and 4 may be formed by cutting a discarded steel tool blank transversely to its length into a number of square blocks each of which is recessed at the top and ground at the sides to form the cutting points $e^2$.

Cutting tools of the kind shown in Figs. 10 to 13 may, as shown in Figs. 14 and 15, conveniently and economically be made by forming a part cylindrical groove $e^3$ in one side of a discarded steel tool shank $e^5$ and then cutting the shank diagonally as represented by the lines $e^6$ in Fig. 14, into a number of blocks of the rhomboid shape shown, each block having its sides afterwards ground to form, with the concave side of the block, the required clearance for the cutting points $e^2$.

Thus, it will be understood that by means of the invention the large numbers of discarded tool shanks composed of expensive steel, common in large engineering workshops, can be economically used up. This constitutes a valuable feature of the invention.

Cutting tools of the kind described may also be cut from a steel bar of the desired cross section.

What I claim is:—

1. A tool holder comprising a metal bar adapted to be fixed in a slide rest or equivalent support and having a recessed front end portion formed with a hole designed to receive holding down means whereby a cutting tool can be rigidly fixed on said recessed portion of the bar and a rear end wall the surface of which is inclined backwardly and upwardly to engage with and support laterally the tool seated on the recessed portion of the bar.

2. For use with a tool holder comprising a metal bar adapted to be fixed in a slide rest or equivalent support and having a recessed front end portion formed with a hole designed to receive holding down means and with an inclined rear end wall, a cutting tool composed of a block of tool steel adapted to be seated on the recessed portion of said tool holder, formed with a hole to register with the hole in the tool holder for the reception of the holding down means and having a plurality of cutting portions at different sides of the tool and a plurality of inclined sides arranged at equal radial distances from the centre of said hole and each adapted to bear evenly against the inclined rear end wall of the recessed front end portion of the tool holder, so that the tool can be turned into different operative positions and will bear uniformly, without liability of damaging any of the said cutting portions, against the inclined rear end wall of the tool holder and will be prevented from turning when placed in each operative position.

3. For use with a tool holder comprising a metal bar adapted to be fixed in a slide rest or equivalent support and having a recessed front end portion formed with a hole designed to receive holding down means and with an inclined rear end wall, a cutting tool composed of a block of tool steel adapted to be seated on the recessed portion of said tool holder, formed with a hole to register with the hole in the tool holder for the reception of the holding down means and having a plurality of cutting edges, a plurality of inclined sides arranged at equal radial distances from the centre of said hole and a recessed upper surface adapted to form with the inclined sides, the required cutting edges, said inclined sides being adapted to bear evenly against the inclined rear end wall of the recessed front end portion of the tool holder, so that the tool can be turned into different operative positions and will bear uniformly, without liability of damaging any of the said cutting edges, against the inclined rear end wall of the tool holder and will be prevented from turning when placed in each operative position.

4. A tool holder according to claim 1, having an upwardly extending tool holding groove in the rear wall of its recessed portion.

5. A tool holder according to claim 1, the rear end wall of the recessed portion of which is formed with laterally inclined tool supporting surfaces.

6. A tool holder comprising a metal bar adapted to be fixed in a slide rest or equivalent support and having a recessed front end portion formed with a hole designed to receive holding down means whereby a cutting tool can be rigidly fixed on said recessed portion of the bar and a rear end wall the surface of which is inclined backwardly and upwardly and provided with a central recess, laterally and rearwardly inclined surfaces and between such surfaces and the central recess, transversely extending flat portions.

7. A combined tool holder and tool comprising a tool holder in the form of a metal bar joggled at its front end forming therein a recess open at its front end, and having a rear end wall the surface of which is inclined backwardly and upwardly and provided with a central recess, and a cutting tool comprising a block of tool steel formed with a hole for the reception of the holding down means and with a concave recess in its top surface and inclined sides forming cutting edges, said tool bearing against the rear inclined side of the recessed portion of the bar and holding down means engaging said bar and tool.

8. A combined tool holder and tool, said tool holder comprising a metal bar having a joggled and perforated front end portion forming a perforated recessed seat and having a backwardly and upwardly inclined rear bearing surface in which is a central upwardly extending groove, a perforated cutting tool seated in the recessed portion of the bar and having one of its corner portions extending into the said groove and held laterally by the sides thereof, and holding down means extending through the perforated front end portion of the bar and engaging the lower side thereof and also the tool.

9. A combined tool holder and tool comprising a metal bar formed at its front end portion with an open recessed seat having a rearwardly and upwardly extending rear surface and a hole through it, a tool of polygonal shape having inclined sides and a recessed upper side forming cutting edges, said tool being prevented from rotating by the said rear end surface of the tool holder and having a hole therethrough co-axial with that in the recessed seat and a holding down bolt extending through the holes in the seat and tool.

10. A combined tool holder and tool, comprising a metal bar having a recessed front end with a hole therethrough and a centrally arranged upwardly extending groove in its rear end wall and a tool of polygonal shape having a hole therethrough and a plurality of cutting edges one of which extends into said groove and a bolt extending through the hole in the bar and tool and holding the parts firmly together.

Signed at London, England, this 5th day of November, 1920.

WALTER TOM TASKER.